Jan. 8, 1935.   A. N. CRAMER   1,986,918
MACHINE FOR FORMING GLASS BOTTLES OR SIMILAR BLOWN GLASS ARTICLES
Filed Oct. 30, 1931   2 Sheets-Sheet 1

INVENTOR
Albert N. Cramer

Jan. 8, 1935.  A. N. CRAMER  1,986,918
MACHINE FOR FORMING GLASS BOTTLES OR SIMILAR BLOWN GLASS ARTICLES
Filed Oct. 30, 1931  2 Sheets-Sheet 2
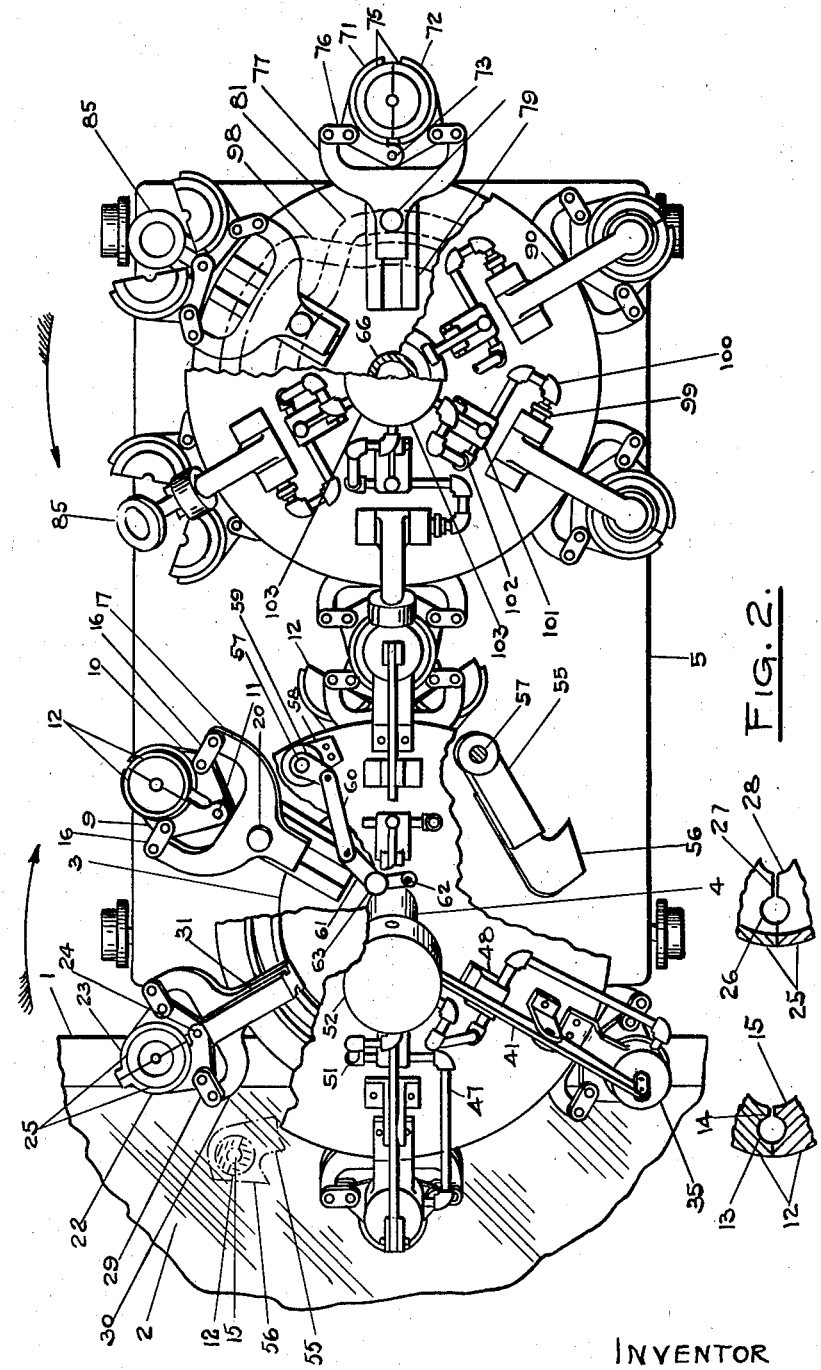
INVENTOR
Albert N. Cramer Patented Jan. 8, 1935

1,986,918

UNITED STATES PATENT OFFICE 1,986,918

MACHINE FOR FORMING GLASS BOTTLES OR SIMILAR BLOWN GLASS ARTICLES

Albert N. Cramer, Toledo, Ohio, assignor, by mesne assignments, to Owens-Illinois Glass Company, Toledo, Ohio, a corporation of Ohio Application October 30, 1931, Serial No. 572,081

51 Claims. (Cl. 49—5)

The present invention relates to improvements in machines for making glass bottles, or similar blown glass articles. It relates particularly to the mechanism for gathering and shaping the glass parison from which the glass bottle, or similar article, is blown.

One of the customary methods of making bottles is the vacuum process; wherein a series of parison molds is moved in an annular horizontal path over the mass of molten glass. During a portion of the cycle of rotation, the mold is lowered into the molten glass, and the mold cavity is exhausted of atmospheric pressure and filled with the molten glass. The mold is then raised out of the molten glass sufficiently for a cut-off knife to be operated in a horizontal plane above the mass of molten glass and beneath the bottom face of the mold. This means that the mold must be raised approximately two inches above the mass of molten glass before the cut-off may be operated. When the mold is withdrawn from the mass of molten glass, a "tail" of glass connects the mass with the glass in the mold cavity. The molds are moving at relatively high speed and the "tail" stretches to considerable length before the cut-off knife is operated. When the cut-off is completed, the "tail" falls laterally on the surface of the mass of molten glass and entraps atmospheric air beneath it. This causes bubbles to form in the mass and they are found eventually in the walls of bottles, as blisters. The stretch of the "tail" of glass, adhering to the bottom of the parison mold, exerts sufficient "pull" on the glass in the mold cavity to pull a small portion therefrom, thereby causing the glass parison to be slightly smaller than the capacity of the mold.

One customary method is to gather the molten glass from a non-rotating, or fixed, pot or gathering portion of the furnace chamber. It is quite obvious that the previously described "tail" will be stretched to the maximum and the resultant blisters will be very numerous. When such maximum "pull" is exerted on the glass in the mold cavity there results a material reduction in the size of the glass parison.

Another method has been employed, wherein a pot, which contains the molten glass, is rotated to carry fresh glass to each succeeding dipping head. The pot and the annularly moving molds are rotated in a manner somewhat similar to meshed gears, although the speeds of travel are not synchronized, the only object being to provide a clear spot into which the mold may be dipped. It is still necessary to raise the mold approximately two inches above the molten glass before the cut-off operation may be accomplished. The "tail" has only stretched the distance represented by the divergence of the path of travel of the mold from the path of travel of that portion of the glass wherein the mold was submerged, plus the difference in the speeds of travel. The length of the "tail" of glass thus produced is less than by the non-rotating method, but it is sufficiently long to entrap a great quantity of bubbles.

One object of the present invention is to so position the parison mold during the cut-off operation that no "tail" of glass may form, thereby eliminating troublesome blisters from the mass of molten glass. Also, as there is no "tail" formed, the glass is retained in the mold cavity and each parison is the exact capacity of the mold cavity.

Another object is to provide a series of parison molds, which is moved in an annular path in a plane inclined to the surface of the mass of molten glass. Thus, an extremely simple mechanism is provided to replace the present cumbersome mechanism required for dipping the parison mold into the molten glass.

Still another object is to provide a series of parison molds, which is moved in an annular path inclined to the surface of the mass of molten glass, and a cut-off knife co-acting with each of the parison molds in a plane parallel to the bottom surface of the parison mold and inclined to the surface of the mass of molten glass. Such cut-off mechanism may be operated just as the mold emerges from the mass of molten glass and before a "tail" has formed between the glass in the mold and the mass of molten glass.

Still another object is to provide a mechanism in which the plane of travel of a series of parison molds is in angular relation with the top surface of the mass of molten glass, and is also in angular relation with the plane in which a series of finishing molds is moved.

Still another object is to provide a mechanism in which the path of travel of a series of parison molds is inclined to the horizontal, and in which the completely formed glass parison hangs vertically when released by the parison mold.

Still another object is to provide a mechanism in which the parison mold is non-vertically disposed with relation to its path of travel. This permits such mold to travel in a path to partially submerge in a mass of molten glass, and still permits the mold to be vertically disposed when the glass parison is released.

Other objects will be apparent hereinafter.

In the accompanying drawings:

Figure 2 is a plan view of the mechanism shown in Figure 1, with sections broken away to better illustrate the different mechanisms.

Figure 3 is a fragmentary view, in cross-section, through the joint of the parison mold sections, and it shows particularly the vacuum ports provided.

Figure 4 is a fragmentary view, in cross-section through the joint of the neck mold sections, and it shows particularly the vacuum ports provided.

Figure 1:
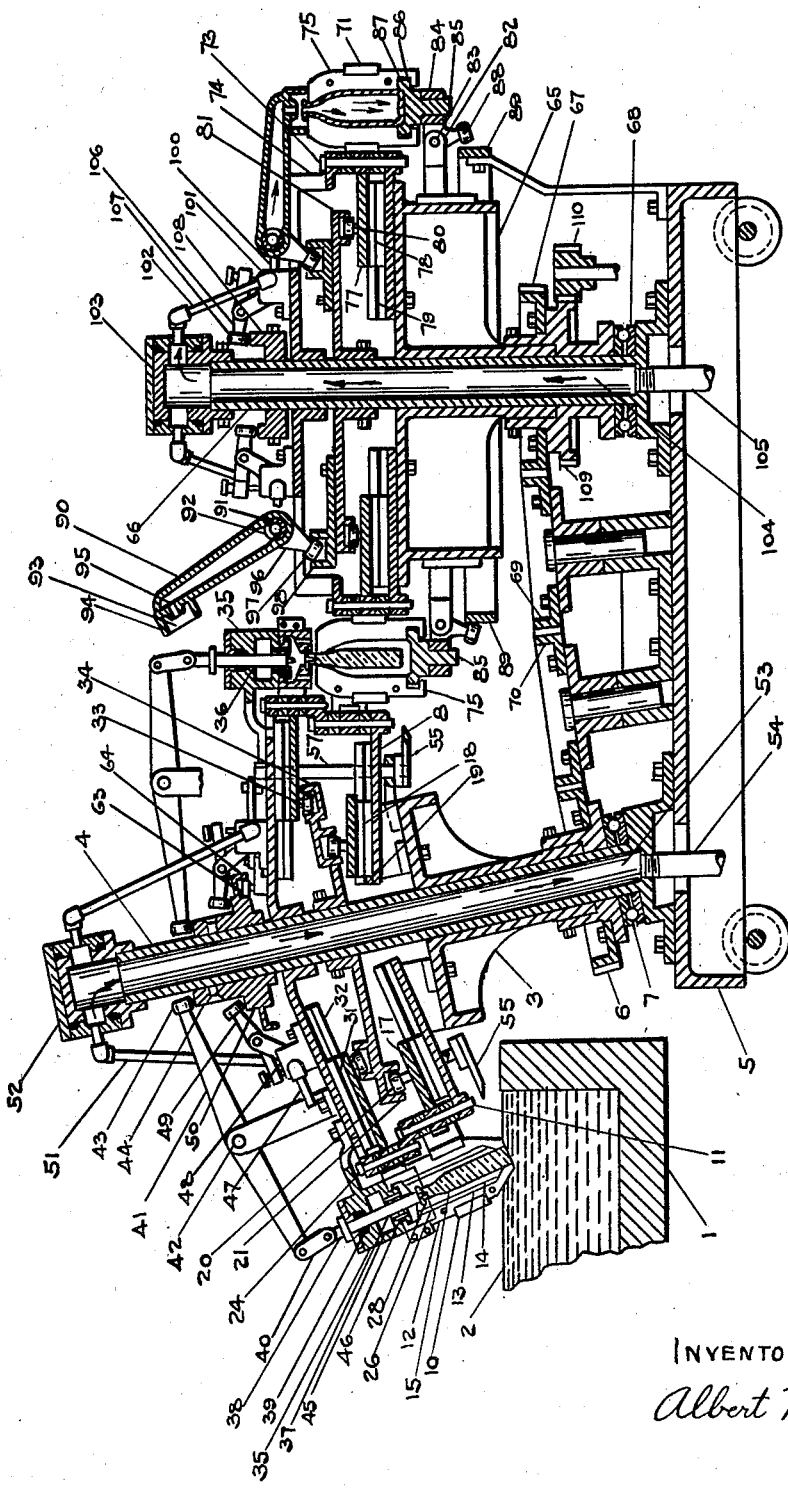
Figure 1 is an elevation view, in section, of the proposed mechanism, and shows particularly the relation between the parison and finishing mold paths and the mass of molten glass.

In the accompanying drawings is shown a machine for making glass bottles, which embodies the elements of this invention. It consists of one table, upon which is mounted a spaced series of parison molds; and an adjacent table, upon which is mounted a series of finishing molds, in co-acting relation with the parison molds. These tables may be continuously rotated, as shown in the drawings, or they may have interrupted, or station to station, movement, such as is commonly used in certain types of bottle machines.

Adjacent the parison mold table, as shown in Figure 1 of the drawings, is a container 1, with molten glass 2 therein. This container may be a portion of the refining chamber of a continuous type tank glass furnace, and the temperature of the molten glass may be maintained in any suitable manner.

The parison mold table 3 is rotatably mounted upon the non-vertically disposed column 4, which is secured to the base 5. Secured to the lower extension of the table is a toothed gear 6 adapted to rotate the table upon the supporting anti-friction bearing 7.

Mounted upon the parison mold table is a series of spaced mold holders 8, each of which is provided with parison mold, neck mold and plunger mechanisms.

The parison mold mechanism comprises mold arms 9 and 10, which are pivotally supported on the pin 11 mounted in the mold holder 8. Parison mold sections 12 are rigidly secured to the arms 9 and 10. Vacuum passages 13 are provided in each mold section, and relatively narrow passages 14 connect the larger passages 13 with the mold cavity 15, which extends throughout the length of the mold. These narrow passages are sufficiently wide to permit the passage of the atmospheric air from the mold cavity to the passages 13; and are sufficiently narrow to exclude the passage of the molten glass from the mold cavity. Links 16 connect the mold arms 9 and 10 to a yoke 17, which is provided with a slide 18 controlled by the slideway 19. The roller 20, attached to the yoke 17, is engaged by the cam 21, which is rigidly secured to the column 4, and which is so constructed that the rotation of the parison mold table will move the yoke into positions to open, or close, the mold sections at predetermined stations during the cycle of rotation of the parison mold table.

The position and movement of the parison mold is of the utmost importance. By reference to Figure 1, of the drawings, it will be noted that the parison mold is moved in an annular path about the non-vertically disposed column, and that the path is inclined to the surface of the molten glass. In such manner, the parison mold may be submerged in the molten glass sufficiently to seal the mold cavity from the external atmosphere, while it is moving in a single plane. The parison mold is positioned non-vertically with relation to the plane in which it travels. Thus, the mold cavity may be filled with molten glass while non-vertically disposed, and it may be vertically disposed when the glass parison is transferred to the finishing mold.

Neck mold mechanism is positioned above the parison mold mechanism and comprises neck mold arms 22 and 23, which are pivotally supported on the pin 24 mounted in the mold holder 8. Neck mold sections 25 are rigidly secured to the arms 22 and 23. Large vacuum passages 26 are adapted to register with the passages 13 of the parison mold, and the relatively narrow passages 27 connect the passages 26 with the neck mold cavity 28. These narrow passages are sufficiently wide to permit the passage of atmospheric air, and are sufficiently narrow to exclude the molten glass. Links 29 connect neck mold arms 22 and 23 to the yoke 30, which is provided with the slide 31 under control of the slideway 32. The roller 33 is attached to the yoke 30 and is engaged by the cam 34, which is rigidly secured to the column 4, by means of the previously described cam 21, and is so constructed that rotation of the parison mold table will move the yoke into positions to open, or close, the neck mold sections at predetermined stations during the cycle of rotation of the parison mold table. The neck mold sections, when closed, form the neck mold cavity 28, which is superimposed on the cavity 15 of the closed parison mold and is in co-operative relation thereto.

Plunger mechanism is positioned above the neck mold mechanism and in co-operative relation thereto. It comprises a body portion 35, rigidly secured to the mold holder 8, and with an annular opening 36 aligned with the axes of the neck and parison molds. A plunger 37, with its upper end 38 extending through the stuffing box 39, is movably positioned in this opening 36. Secured to the upper end of the plunger is the link 40, connected at its opposite end to the lever 41, which is pivoted at 42 and provided with the cam roller 43 controlled by the cam 44, which is rigidly secured to the column 4. The cam 44 is so constructed that the rotation of the parison mold table causes the plunger 37 to be raised, or lowered, at predetermined stations during the cycle of rotation of the table. The plunger, when lowered, is in co-operative relation with the neck mold cavity 28 to form the mouth, or finish, of the bottle. In its upper position it is raised sufficiently to permit the transfer of the glass parison from the parison mold to the finishing mold. The body portion 35 is provided with a vacuum chamber 45, which is connected to the interior of the neck mold by means of the passages 46, and thence through the passages 26 to the parison mold passages 13. Pipe 47 connects the vacuum chamber 45 with the vacuum valve 48, which is normally held closed by the atmospheric pressure in the chamber 45. The lever 49 co-acts with the cam 50, at predetermined stations during the cycle of rotation of the parison mold table, to open the valve 48 and connect the pipe 47, through the pipe 51, to the vacuum distributing head 52. The column 4 supports the distributing head 52, and by means of the passageway 53 and the pipe 54, it is connected to a suitable means, not shown, for exhausting atmospheric pressure.

A cut-off knife 55 is positioned with its cutting edge 56 in the same plane as the bottom face of the parison mold sections 12, and is secured to the lower end of the shaft 57. Suitable bearings 58 are provided to permit rotation of the shaft 57. At its upper end, the shaft 57 is provided with a lever arm 59, which is connected by means of the link 60 to one end of the bent lever 61. At its other end, this lever is fulcrumed at 62, and interposed between the ends is the roller 63 controlled by the cam 64, which is constructed to partially rotate the shaft 57 at predetermined stations during the cycle of rotation of the parison mold table. Normally the cut-off knife is held in non-cutting position, as shown in solid lines in Figure 2 of the drawings. However, as the parison mold emerges from the mass of molten glass, the knife is actuated by the cam 64 so that the cutting edge 56 completely passes the open end of the parison mold cavity, as shown in dot-and-dash lines in Figure 2 of the drawings, while it is in contact with the bottom surface of the mold. Thus the molten glass in the mold is completely severed from the mass of molten glass in the receptacle. The cam 64, returns the knife to normal position, when the cutting action is completed.

The finishing mold table 65 is rotatably mounted about the vertically disposed column 66, which is rigidly secured to the base 5, in spaced relation with the column 4 of the parison mold table. Secured to the lower extension of the table is the toothed gear 67, which is adapted to rotate the table upon the anti-friction bearing 68, and which is meshed, through the toothed gears 69 and 70, with the gear 6 of the parison mold table. Thus, synchronized rotation of the parison and finishing mold tables is assured, and such rotation is in opposed directions as indicated by the arrows in Figure 2 of the drawings.

Mounted upon the finishing mold table are finishing mold, bottom plate and blow head mechanisms.

The finishing mold mechanism comprises mold arms 71 and 72, which are pivotally supported upon the pin 73 mounted in the holder 74. Finishing mold sections 75 are secured to the arms 71 and 72. Links 76 connect the ends of the mold arms to the yoke 77, which is provided with a slide 78 controlled by the slideway 79. The roller 80, attached to the yoke 77, is engaged by the cam 81, which is rigidly secured to the column 66, and which is so constructed that rotation of the finishing mold table will move the yoke 77 into positions to open, or close, the mold sections at predetermined stations during the cycle of rotation of the finishing mold table.

By reference to Figure 1, of the drawings, it will be noted that the finishing mold table is moved in a horizontal plane, and that the finishing molds are vertically disposed throughout the complete cycle of rotation. This is essential in order to produce bottles with uniformly thick walls and to insure perfectly centered, or "non-heel tapped", bottles, as part of the action of forming the bottle in the finishing mold is to allow the soft parison to stretch just prior to the actual blowing of the completed bottle.

The bottom plate mechanism comprises a bracket 82, one end of which is fastened to the finishing mold table, and the other end of which is provided with a pin 83 upon which the bottom plate holder 84 is fulcrumed. The upper end of the holder is provided with an annular opening to receive the bottom plate 85. The annular flange 86 at the upper edge of the bottom plate is adapted, when in horizontal position, to register with the annular recess 87 of the finishing mold sections 75, to insure proper alignment of the bottom plate with the finishing mold, when in operative relation therewith. The lower end of the holder 84 is provided with a roller 88, which co-acts with the cam 89 to position the bottom plate relative to the horizontal plane. While the finishing molds are closing about the glass parison, as it approaches the station for transferring it from the parison mold table to the finishing mold, the cam 89 maintains the bottom plate 85 in horizontal position while the recess 87 is enclosing the flange 86. When the finishing molds are completely closed and the bottom plate locked in position by its flange, the cam 89 releases control of the roller 88. In the accompanying drawings, the completely blown bottle is shown as delivered from the bottle machine by a commonly used method of tilting the bottom plate to cause the bottle to topple into a chute, or other suitable receptacle, not shown in the drawings. To accomplish this, the cam 89 regains control of the bottom plate just prior to the opening of the finishing mold and after the bottle has been completely formed; and it retains control while the finishing mold is completely opened to release the flange 86. At this position the cam is constructed to gradually tilt the bottom plate from the horizontal as the finishing mold table is rotated, until the bottle topples off the bottom plate upon its side in the chute, or other receptacle.

The blow head mechanism consists of a hollow arm 90 secured to the hollow shaft 91. An opening 92 through the wall of the hollow shaft forms a continuous passageway from the hollow shaft to the hollow arm. At the end of the arm 90 is provided a cup 93 adapted to non-contactingly enclose the mouth of the bottle which rests on the top of the finishing mold. The flange 94 is constructed to rest on the top surface of the finishing mold, to seal the air under pressure therein from the external atmosphere. The hollow arm 90 is constructed at one end to form a blowing nozzle 95 which directs the air under pressure to the interior of the bottle. At its other end is constructed an extension 96 to which is secured the cam roller 97, which is controlled by the cam 98 secured to the column 66. The hollow shaft 91 is closed at one end, and at the other end is provided with a hollow swivel connection 99, which is connected through the pipe 100 to a valve 101 for controlling the passage of air under pressure. Pipe 102 connects the air valve 101 to the distributing head 103, which is supplied through the passage 104 and pipe 105 with air under pressure from any suitable source, not shown. The valve 101 is normally held closed by the pressure of the air supplied by the pipe 102, and is provided with a lever 106, upon the end of which is mounted a roller 107 co-acting with the cam 108 to open the valve at predetermined stations during the cycle of rotation of the finishing mold table.

For imparting motion to the mold tables, toothed gear 109 is secured to the lower extension of the finishing mold table and is meshed with the toothed pinion 110, which is driven by any suitable source of power, not shown, to provide either continuous, or interrupted, rotation of the tables. The previously described gear 67 is secured to the gear 109, and the parison mold table is synchronously rotated with the finishing mold table, by means of the previously described gears 69 and 70, which control the gear 6 secured to the lower extension of the parison mold table.

In operation, the parison mold sections and the neck mold sections are closed and the plunger is in position to form the bottle mouth, or finish, as the parison mold table is rotated to carry these molds towards the mass of molten glass. Continued rotation of the table carries the parison mold over the molten glass and its lower end is submerged therein sufficiently to close the open end of the mold cavity. At this time the vacuum valve is opened and the atmospheric air is exhausted from the mold cavity and replaced by the molten glass, which is forced therein by the atmospheric pressure exerted on the surface of the molten glass. Further rotation of the table raises the bottom of the parison mold from the mass of molten glass. As the open end of the mold cavity emerges from the molten glass, the cut-off knife is actuated to sever the glass that is exterior of the mold cavity from that which is in the mold cavity. Thus is formed a complete glass parison. During the continued rotation of the parison mold table, the vacuum valve is closed and the plunger is withdrawn from the mouth of the parison. The parison mold, which has been non-vertically disposed, gradually assumes a more nearly vertical position, until, just prior to reaching the transfer station, it is positioned substantially vertically. At this position of the mold table, the parison mold is opened and the glass parison hangs pendant from the neck mold.

As the parison mold section approaches the transfer station, a finishing mold section is moving synchronously to the same station, and the finishing mold sections are being gradually closed while the bottom plate is held in a horizontal position, until, at the transfer station they have completely closed about the glass parison. At this instant the neck mold sections start to open to release the bead at the mouth of the parison, by which the glass parison has been held pendant. The release is quite rapid and is accomplished before the glass parison, which is now enclosed in the finishing mold, has been moved substantially from the path traversed by the neck mold. When completely released, the glass parison drops so that the bead at its mouth rests on the top surface of the finishing mold.

The transfer of the glass parison is completed and during the continued rotation of the parison mold table the parison mold parts are re-adjusted to receive the next succeeding charge from the mass of molten glass, as previously described.

The continued rotation of the finishing mold table permits the glass parison, which is quite soft, to sag to contact with the bottom plate, and the blow head is lowered to seat on the top of the finishing mold. At this position the air valve is opened and air under pressure is delivered from the blowing nozzle to the interior of the glass parison, which is thus expanded to the walls of the finishing mold. The air under pressure is maintained during that portion of the cycle of rotation which is required to harden the completely formed bottle sufficiently to maintain its shape; at which time the air valve is closed and the blow head is raised from the top surface of the finishing mold. Further rotation of the table carries the finishing mold to that position at which the finishing mold sections are opened, and the finished bottle now stands on its base upon the bottom plate. Still further rotation carries the bottom plate to the discharging position where it is tilted sufficiently to cause the bottle to topple from the bottom plate onto its side in a chute, or other suitable receptacle, for transferring it to an oven for suitable annealing.

It is not the intention to confine this invention to the particular type of vacuum bottle machine described in these specifications; it is equally applicable to other types of machines, as for instance machines wherein the finishing mold is hinged and adapted to swing vertically to enclose the glass parison.

Modifications may be resorted to within the spirit and scope of the appended claims.

What I claim is:

1. In a bottle machine, a receptacle with molten glass therein, a parison mold with its bottom end open and inclined to the surface of said molten glass, a cut-off knife positioned in the same plane as the bottom surface of said mold, and means to operate said cut-off knife.

2. In a bottle machine, a receptacle with molten glass therein, a parison mold with its open end inclined to the surface of said molten glass, a cut-off knife, and means to operate said cut-off knife downwardly and inwardly toward said molten glass in a direction at the same inclination as said mold end.

3. In a bottle machine, a receptacle with molten glass therein, a parison mold with its bottom end open, means for moving said parison mold in a path inclined to the surface of said molten glass, a cut-off knife, and means for moving said cut-off knife toward and from said end of the mold in substantially the plane in which said end of the mold moves.

4. In a bottle machine, a receptacle with molten glass therein, a parison mold, means for forming a glass parison from said molten glass in said parison mold while non-vertically disposed, means for moving said parison mold in an annular path to a vertically disposed position, a finishing mold, means for transferring said glass parison from said vertically disposed parison mold to said finishing mold, and means for expanding said glass parison to the walls of said finishing mold.

5. In combination, a bottle machine and a receptacle with molten glass therein, said machine comprising a series of parison molds, means for moving said series of parison molds in an annular path inclined to the surface of said molten glass, the center of said path being at one side of said receptacle and spaced horizontally therefrom, and means for filling said parison molds successively with said molten glass.

6. In combination, a bottle machine and a receptacle with molten glass therein, said machine comprising a series of parison molds, and means for moving said series of parison molds in an annular path inclined to the surface of said molten glass, the center of said path being at one side of said receptacle and spaced horizontally therefrom, said parison molds positioned and adapted to successively and partially submerge in said molten glass.

7. In a bottle machine, a receptacle with molten glass therein, a series of parison molds positioned to successively and partially submerge in said molten glass while non-vertically disposed, means for moving said series of parison molds in an annular path inclined to the surface of said molten glass and to a position where each of said parison molds are successively vertically disposed, a series of vertically disposed finishing molds adapted to register with said series of parison molds while in said vertically disposed position, and means for moving said series of finishing molds in an annular path parallel to the surface of said molten glass.

8. In a bottle machine, a receptacle with molten glass therein, a series of parison molds positioned to be partially submerged in said molten glass while non-vertically disposed, means for forming a glass parison in successive parison molds, means for moving said series of parison molds in an annular path inclined to the surface of said molten glass and to a position where each of said parison molds is successively vertically disposed, a series of vertically disposed finishing molds, means for transferring said glass parisons from successive parison molds to complemental finishing molds, means for moving said series of finishing molds in an annular path parallel to the surface of said molten glass, means for expanding said glass parisons successively to the walls of said finishing molds, and means for discharging said expanded glass parisons from successive finishing molds at a predetermined station.

9. The combination of a receptacle containing a supply body of molten glass and a machine for forming glass articles, said machine comprising a parison mold, means for moving the mold in an annular path such that any point in the mold travels in a path parallel to a plane, said mold being inclined relatively to said plane, means for filling the mold with molten glass from said supply body, a cutter, and means for imparting a downwardly inclined stroke to the cutter and thereby severing the glass in the mold from said supply body.

10. The combination of a receptacle containing a supply body of molten glass, of a machine for forming glass articles, said machine comprising a parison mold, means for so moving the mold that any point therein travels in a closed path lying wholly within a plane inclined to the surface of said supply body of glass, and means for opening and closing the mold, said last mentioned means being operable in a plane inclined to said first mentioned plane.

11. The combination of a receptacle to contain a pool of molten glass and a machine for making glass articles, said machine comprising a parison mold, means for moving said mold in a closed path such that any point in the mold travels in a closed path lying wholly within a plane inclined to the surface of said pool, means for opening and closing the mold, a cut-off knife, and means for operating said knife, said last two means being operable in planes inclined to said first mentioned plane.

12. The combination of a receptacle to contain molten glass and a machine for forming glass articles, said machine comprising a table, a series of parison molds thereon, a stationary column inclined to the vertical, means for rotating said table about said column, means for introducing charges of molten glass from the receptacle into said molds and forming parisons therein, a finishing mold table, a series of finishing molds thereon, a vertical column, means for rotating the finishing mold table about said vertical column, and automatic means for transferring parisons from the parison molds to the finishing molds.

13. The combination of a receptacle to contain molten glass and a machine for forming glass articles, said machine comprising a series of parison molds, means for moving said series of molds in an annular closed path inclined to the surface of said glass, means cooperating with the molds for introducing charges of glass into the molds and forming parisons therein, a series of finishing molds, means for moving said series of finishing molds in an annular path parallel to the surface of said glass, and means for transferring parisons from the parison molds to the finishing molds.

14. The combination with a container for a pool of molten glass, of a machine comprising a parison mold, and means for rotating the mold in an inclined annular closed path so positioned that the mold is brought by such rotation into contact with the glass in the container and when at its greatest distance from said point of contact with the glass is in a position laterally beyond the container.

15. The combination with a container for a pool of molten glass, of a machine for forming hollow glass articles, said machine comprising a parison mold, and means for moving the mold in a closed path such that any point in the mold moves in a closed path lying wholly within a single inclined plane so positioned with respect to said container that the mold is periodically and alternately brought to a gathering position over the container and to a position laterally beyond the container and in which it is at its greatest distance from said gathering position.

16. The combination with a container for a pool of molten glass, of a machine for forming hollow glass articles, said machine comprising a mold carriage, means for rotating the carriage about an inclined axis, the axial portion of the machine being at one side of said container, and a mold on the carriage in position to be brought by the rotation of the carriage alternately to diametrically opposite points in its path of travel in which it is respectively in a gathering position over the container and in a position laterally beyond the container.

17. The combination with a container for a pool of molten glass, of a machine for forming hollow glass articles, said machine comprising a mold carriage, means for rotating the carriage about an inclined axis, the axial portion of the machine being at one side of said container, a mold on the carriage in position to be brought by the rotation of the carriage alternately to diametrically opposite points in its path of travel in which it is respectively in a gathering position over the container and a parison transfer position laterally beyond the container, means cooperating with the said mold for forming a parison therein, a finishing mold, means for rotating the finishing mold about an axis inclined to said first mentioned axis, and means for transferring the parison to the finishing mold.

18. The combination of a container for molten glass, a mold carriage rotatable about an inclined axis, and a mold on said carriage and rotated therewith in a closed path the mold being so positioned on the carriage that it is periodically brought by the rotation of the carriage, to a charge receiving position over the glass in said container, the major portion of the mold carriage being positioned at one side of and laterally beyond said container.

19. The combination of a container for a pool of molten glass, a mold carriage rotatable about an inclined axis positioned laterally beyond said container, and a mold on said carriage spaced from said axis in such position that it is brought periodically by the rotation of the carriage, to a charge receiving position over the pool of glass in the container.

20. The combination of a container for a pool of molten glass, a mold carriage, a mold thereon, means for rotating the carriage about an inclined axis and bringing the mold periodically to a charge gathering position over the pool of glass, and means for introducing charges of glass by suction into the mold from said pool, said axis of rotation at the level of the rim of said container being positioned laterally beyond the container.

21. The combination of a container for a pool of molten glass, a mold carriage, a mold thereon, means for rotating the carriage about an inclined axis and bringing the mold periodically to a charge gathering position over the pool of glass, and means for introducing charges of glass by suction into the mold from said pool, said axis being more nearly vertical than horizontal.

22. A machine for forming glass articles comprising mold carriages arranged side by side, one of said carriages being mounted to rotate about a vertical axis and the other being mounted to rotate about an inclined axis, means for rotating said carriages in synchronism, parison molds on the carriage which rotates about an inclined axis, finishing molds on the other carriage, said molds being periodically brought by the rotation of the carriages to a transfer position between said axes, and means for transferring parisons from the parison molds to the finishing molds at said transfer position.

23. The combination of a series of molds, means for causing said molds to travel in a closed inclined path such that any point in said molds moves throughout its travel, in an inclined plane, a second series of molds, means for causing them to travel in a closed horizontal path at one side of the first mentioned path with their axes vertical, means for forming parisons of glass in the molds of the first said series, and means for transferring the parisons to the molds of the other series, the molds which travel in said inclined path being arranged at such an angle to their axis of rotation that their axes are vertical when at the transfer position.

24. A machine for forming glass articles comprising, in combination, mold carriages arranged side by side, means for rotating the carriages in synchronism, one said carriage being arranged to rotate about an inclined axis, a parison mold on said last named carriage including a neck mold and a body blank mold in register therewith, a finishing mold on the other carriage, means cooperating with the parison mold for forming a parison therein, said molds being brought periodically to a parison transfer position between said axes, said molds being arranged at such angles to their respective axes of rotation that the axes of the molds are vertical when at the transfer position, means for opening the body blank mold and leaving a parison suspended vertically from the neck mold at the transfer position, means for closing the finishing mold about the suspended parison, and means for releasing the parison from the neck mold and thereby completing a transfer of the parison.

25. The combination of a receptacle for molten glass and a bottle machine positioned at one side thereof, said machine comprising a parison mold and means for moving it in an annular path, the center of which is at one side of said receptacle and spaced therefrom, said path being inclined to the horizontal with its lowermost portion overhanging the receptacle in such position that the mold in its travel along said path is brought to a charge receiving position over the molten glass in the receptacle.

26. The combination of a receptacle for molten glass and a bottle machine at one side thereof, said machine comprising a parison mold open at one end to receive a charge of glass and means for moving said mold in a closed path parallel throughout with a single inclined plane, the major portion of said path being at one side of the receptacle, with the lowermost portion thereof overhanging the receptacle, the open end of the mold when over the receptacle being brought into position to contact with the glass in the receptacle.

27. The combination of a receptacle for molten glass and a bottle machine at one side thereof, said machine comprising a parison mold having its axis inclined to the vertical and open at its lower end to receive a charge of glass, means for moving the mold in a closed path such that the direction of movement of the mold is parallel throughout with a single inclined plane, the center of said path being at one side of the receptacle and spaced horizontally therefrom, the lower portion of said path overhanging the receptacle in such position that said open end of the mold is brought into contact with the glass in the receptacle, and means for drawing a charge of glass into the mold.

28. The combination of a receptacle for molten glass and a bottle machine at one side thereof, said machine comprising a parison mold, means for moving said mold in a closed path inclined to the surface of the glass in the receptacle, the center of said path being at one side of the receptacle and spaced horizontally therefrom, said path having its lower portion overhanging the receptacle, said mold being open at its lower end to receive a charge of glass, said end being in fixed angular relation to the path of travel of the mold.

29. The combination of a receptacle containing a supply body of molten glass and a machine for forming glass articles, said machine comprising a mold carriage, a parison mold thereon, means for rotating the carriage about an inclined axis and thereby moving the mold in a closed annular path extending over said receptacle and supply body of glass, the mold having its axis inclined with respect to said axis of rotation at a constant angle such that when over the supply body of glass it is inclined thereto and when beyond the supply body it is brought to the vertical, means for filling the mold with glass from said supply body while the mold is in said inclined position thereover, and means for opening the mold while vertical.

30. The combination of a receptacle to contain a pool of molten glass and a machine for forming glass articles, said machine comprising a parison mold, means for moving said mold in an annular closed path which is inclined to the vertical and which projects over said receptacle and pool, the parison mold being inclined to said path at a fixed angle such that the mold is non-vertically disposed when brought by its movement in said path to a gathering position over the pool and is vertically disposed when it reaches a transfer position beyond said receptacle, means for introducing a charge of molten glass from the pool into the mold and forming a parison therein while the mold is at said gathering position and non-vertically disposed, a finishing mold, and means for removing the parison from the parison mold while the latter is at the transfer position and vertically disposed, and transferring it to the finishing mold.

31. In a machine for forming hollow glass articles, a receptacle with a pool of molten glass therein, a parison mold with its bottom end open and inclined to the surface of said pool, a cut-off knife, means to operate said knife and cause it to shear across said bottom end of the mold with the knife moving toward the pool of glass during its severing operation and in a plane inclined to said surface, and means to guide and maintain the knife in said plane during said operation.

32. In combination, a receptacle with a pool of molten glass therein and a machine for forming glass articles, said machine comprising a parison mold with its lower end open and inclined to the surface of the pool, means for so moving the mold that said open end is caused to travel in a path such that its direction of movement is parallel throughout with a single plane and said end is periodically submerged in said glass, means for filling the mold with glass, a cutter, means for imparting a downwardly inclined stroke to the cutter as the mold emerges from the supply body of glass and thereby causing it to shear across said inclined end of the mold and sever the glass in the mold from said supply body, and means for guiding and maintaining the cutter in a downwardly inclined plane during said stroke.

33. The combination with a receptacle containing a pool of molten glass, of a machine for making glass articles, said machine comprising a parison mold having its lower end open and inclined to the surface of the pool, means for moving the mold in an annular path and causing it periodically to dip in the pool, means for filling the mold with glass from the pool, a cutter, means for imparting a downwardly inclined stroke to the cutter and thereby causing it to shear across said end of the mold and sever the glass in the mold from that in the pool, and means for guiding and maintaining the cutter in a downwardly inclined plane during said stroke.

34. A machine for forming glass articles comprising a parison mold carriage, parison molds thereon, a finishing mold carriage, vertical finishing molds thereon, said parison mold carriage being mounted to rotate about an inclined axis and said finishing mold carriage being mounted to rotate about a vertical axis, means for rotating the carriages in synchronism, said molds being periodically brought by the rotation of the carriages to a transfer position between said axes, and means for transferring parisons from the parison molds to the finishing molds at said transfer position, the parison molds being at such an angle to their axis of rotation that they are vertical when at said transfer position.

35. The combination of a receptacle for a pool of molten glass and a machine for forming glass articles, said machine comprising a parison mold with a flat open bottom, means for charging said mold while the bottom is submerged in the molten glass, means for positioning the mold over the pool with its longitudinal axis inclined to the vertical and its bottom inclined to the surface of the pool, a cut-off knife, and means for operating the knife in the plane of said bottom while the latter is in said inclined position.

36. The combination of a receptacle for molten glass and a machine for forming glass articles, said machine comprising a parison mold with an open bottom with its surface perpendicular to the longitudinal axis of said mold, means for charging the mold, means for positioning the mold over the glass in the container with said bottom surface inclined to the horizontal, a cut-off knife, and means for shearing the knife across said bottom surface while said surface is in said inclined position.

37. The combination of a receptacle for molten glass and a machine for forming glass articles, said machine comprising a parison mold with an open bottom, means for positioning the mold over the glass in the receptacle with said mold bottom inclined, a cut-off knife, and means for operating the knife in a single inclined plane from a position over the rim of the receptacle to a cut off position beneath said rim while the mold is in said position over the glass.

38. The combination with a machine for forming glass articles, of a receptacle for a pool of molten glass, said machine comprising a parison mold with an open bottom, means for periodically bringing the mold to a charge receiving position in which it is non-vertically disposed and partly submerged in said molten glass, suction means for charging the mold while in said position, cut-off mechanism coacting with said mold, and means to actuate the cut-off mechanism and sever the glass while the mold is non-vertically disposed and as it emerges from the pool of molten glass.

39. In a machine for forming glass blanks, a container with a mass of molten glass therein, an inclined column, a series of molds adapted to rotate about said column and successively contact with the surface of said molten glass, means for filling successive molds with said molten glass while in contact therewith, means for removing adhering portions of glass from the exterior of said molds as they successively break contact with said molten glass, and means for discharging the blanks formed in said molds successively at a predetermined position.

40. In combination, a glass forming machine and a container with molten glass therein, said machine comprising a fixed inclined column, and a series of molds rotating in a closed path about said column and adapted to contact with said molten glass.

41. In glass forming apparatus, the combination of a container with molten glass therein, a series of molds, means for rotating the molds, means for supporting and guiding the molds in a path such that each point in the mold travels in a path parallel with a plane inclined to the horizontal and to the surface of said molten glass and causing the molds to be lowered into contact with the molten glass by said rotation, means for introducing molten glass into the molds, and means for severing the glass in the molds from the molten glass in the container.

42. Glass forming apparatus comprising, in combination, a container with a pool of molten glass therein, molds open at their bottoms, means for rotating the molds, means for supporting and guiding the molds in a path such that each point in the mold travels in a path parallel with a plane inclined to the horizontal and to the surface of said molten glass, said path extending over the pool of glass in such position that said bottoms are submerged in the glass as they travel over the pool, means for filling the molds with molten glass while said bottoms are submerged, and means for removing the glass adhering to the exterior of the molds when emerging from the pool.

43. Glass forming apparatus comprising, in combination, a container for molten glass, molds with openings in the bottom surfaces, a fixed inclined column, and means for rotating said surfaces about said column and causing them to contact with the top surface of the molten glass during such rotation.

44. Glass forming apparatus comprising, in combination, a container for molten glass, molds with openings in their bottom surfaces, an inclined column, and means for rotating said surfaces about said column in a path such that each point in said surfaces rotates in a plane perpendicular to said column and inclined to the top surface of said molten glass with the path of said surfaces extending over the container and downward into position to bring the said mold openings into charge gathering relation to the glass in the container.

45. Glass forming apparatus comprising, in combination, a container with molten glass, an inclined column laterally adjacent said container, and a mold with its bottom surface rotatable in a path such that each point in said bottom surface rotates in a plane perpendicular to said column, said path being so positioned that the mold bottom is brought into contact with the surface of said molten glass during such rotation.

46. Glass forming apparatus comprising, in combination, a container with molten glass, an inclined column adjacent said container, and a mold with its bottom surface rotatable in a path such that each point in said bottom surface rotates in a plane perpendicular to said column, said path being so positioned that the mold bottom is brought into contact with the surface of said molten glass during such rotation.

47. Glass forming apparatus comprising, in combination, a container for molten glass, molds, driving means for causing the molds to travel, and mechanism for supporting and guiding the molds in a closed path of travel which is above said glass, said path being such that each point in the molds travels parallel with a plane inclined between the horizontal and vertical, said path being so positioned that the molds are periodically brought during their travel, over the said container and downward below the rim of the container into contact with the glass in the container.

48. Glass forming apparatus comprising, in combination, a container with a pool of molten glass therein, molds, means for rotating the molds, means for supporting and guiding the molds during such rotation in a circular path such that each point in the molds travels parallel with a plane inclined to the horizontal and to the surface of said molten glass, said path being so positioned that the molds are brought over the container and lowered into position to gather charges of glass from the pool during their rotation in said path, and means for introducing said charges of glass into the molds.

49. A machine for forming hollow glass articles comprising a mold carriage, means for rotating it about an inclined axis, and a mold mounted on the carriage with its axis in a plane with said inclined axis and with the said axes inclined to each other.

50. A machine for forming hollow glass articles comprising a mold carriage, means for rotating it about an inclined axis, and a mold mounted on the carriage with its axis in a plane with said inclined axis and with the said axes inclined to each other, the inclination of the mold axis being such that during each complete rotation of the mold carriage the mold is brought to a position in which its axis is vertical.

51. A machine for forming glass articles comprising a mold carriage, an annular series of molds thereon, a stationary inclined column, means for rotating the mold carriage about the inclined axis of said column, said molds each comprising laterally separable sections, and pivot pins on the mold carriage, said pins being individual to the molds and parallel with the axes of their respective molds, the mold sections being mounted to swing about said pivot pins for opening and closing the molds, said pivot pins being inclined to the axis of the mold carriage and so positioned relative thereto that said pins and their respective molds are periodically brought to a vertical position by the rotation of the mold carriage.

ALBERT N. CRAMER.